US012718063B2

(12) United States Patent
Bidkar et al.

(10) Patent No.: US 12,718,063 B2
(45) Date of Patent: Aug. 25, 2026

(54) DEEP LEARNING ARCHITECTURE FOR ADVERSE MEDIA SCREENING

(71) Applicant: Bank of America Corporation, Charlotte, NC (US)

(72) Inventors: Prashant Anna Bidkar, Shakarpur (IN); Ranjan Verma, Faridabad (IN); T R Krishnan, New Delhi (IN); Prashant Khare, Mumbai (IN); Pradeep Gahtori, New Delhi (IN); Vihar Sharoff, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 1008 days.

(21) Appl. No.: 17/950,153

(22) Filed: Sep. 22, 2022

(65) Prior Publication Data

US 2024/0104347 A1 Mar. 28, 2024

(51) Int. Cl.
*G06N 3/045* (2023.01)
*G06N 3/067* (2006.01)

(52) U.S. Cl.
CPC .......... *G06N 3/045* (2023.01); *G06N 3/0675* (2013.01)

(58) Field of Classification Search
CPC .......................... G06N 3/045; G06N 3/0675
USPC .......................................................... 706/18
See application file for complete search history.

(56) References Cited

U.S. PATENT DOCUMENTS 10,593,422 B2* 3/2020 Manica ............ G06F 18/24147
11,039,205 B2 6/2021 Ye et al.
2018/0239832 A1 8/2018 Galuten
2019/0207960 A1* 7/2019 Chu ...................... G06F 18/22
2020/0312348 A1* 10/2020 Shao ..................... G10L 21/10
2021/0049366 A1 2/2021 Horton et al.

FOREIGN PATENT DOCUMENTS

WO WO2021/256884 12/2021

OTHER PUBLICATIONS

Nguyen et al, "FANG: Leveraging Social Context for Fake News Detection Using Graph Representation", 2020 (Year: 2020).*

(Continued)

*Primary Examiner* — Abdullah Al Kawsar
*Assistant Examiner* — Jun Kwon
(74) *Attorney, Agent, or Firm* — Weiss & Arons LLP

(57) ABSTRACT

Systems, methods, and apparatus are provided for deep learning architecture for adverse media screening. A dynamic data stream may be generated from news reports acquired from a variety of media channels in a variety of formats. Reports may be separated by format. A graphing module for each type of media may use geometric clustering algorithms to group reports into a coherence graph. Fact-checking sources may be incorporated into the graph. A graph neural network may determine coherence between news claims and fact-checking sources, between news claims and supporting report details, between similar reports, and/or between video and audio within the report itself. The network may output a legitimacy score for a report. A credible report may be flagged and retrieved in the course of a customer screening. Materiality may be determined for a credible report and may trigger a customer account closure protocol.

17 Claims, 6 Drawing Sheets

(56) References Cited

OTHER PUBLICATIONS

Yan et al, "All-optical graph representation learning using integrated diffractive photonic computing units", Jun. 2022 (Year: 2022).*

Balmau et al, "Limiting the Spread of Fake News on Social Media Platforms by Evaluating Users' Trustworthiness", 2018 (Year: 2018).*

* cited by examiner

DEEP LEARNING ARCHITECTURE FOR ADVERSE MEDIA SCREENING

FIELD OF TECHNOLOGY

Aspects of the disclosure relate to deep learning networks.

BACKGROUND OF THE DISCLOSURE

Client relationships may present a series of risks to an enterprise as the enterprise may be affected by bad behavior on the part of the client. Client onboarding as well as ongoing client relationships require due diligence and monitoring to protect the enterprise reputation and ensure compliance with regulatory requirements.

Data mining and automated media screening may be useful tools for gathering client information. However, conventional approaches for screening adverse media claims have many technical deficiencies. For example, it is difficult to manage the vast numbers of reports across many different channels, leading to large backlogs. Further, conventional text analysis does not factor in political and social context, making it difficult to determine credibility.

It would be desirable to provide a system for real-time streaming analysis for media across multiple channels and multiple modes of delivery. It would be desirable to employ deep learning powered by optical computing for fast, comprehensive analysis capable of scoring legitimacy of a news claim based on content, context, and source quality, as well as on the technical features of the report itself.

SUMMARY OF THE DISCLOSURE

Systems, methods, and apparatus for deep learning architecture for adverse media screening are provided.

A dynamic data stream may be generated from news reports acquired from a variety of media channels in a variety of formats. Illustrative formats may include text-based media, video-based media, and audio-based media. The reports may be separated by format and duplicate reports may be removed.

A graphing module for each type of media may use geometric clustering algorithms to group reports into a coherence graph composed of nodes and edges. Nodes may correspond to reports and edges may correspond to relationships between node attributes. Relationships may be determined using cosine similarity or any suitable method. In some embodiments, fact-checking sources may be incorporated into the graph. The graphing module may use optical computing to manage the dynamic data stream in real time.

A text-based media coherence graph may be input to a deep learning text coherence network. The network may convert the text to word embeddings. Word embeddings for report claims, report details, and for related fact-checking sources may be input to a graph neural network. The network may concatenate features and use multiple fully connected layers to determine coherence between a report claim, related reports, and confirmed sources. Weighting may be adjusted based on the size of the cluster, based on similarity metrics, based on the report source, or on any suitable factor. The network may output a credibility score for the text-based news report. A credible report may be flagged and stored in enterprise systems.

A video-based media coherence graph may be input to a deep learning event acoustic coherence network. A video report may be split into time-based frames. An integrated convolutional neural network may extract and identify events from a video frame. An integrated speech-to-text architecture may extract and interpret audio associated with the frame. The network may determine coherence between the events and the audio at the timestamp level. Weighting may be adjusted based on the size of the cluster, based on similarity metrics, based on the report source, or on any suitable factor. The network may output a credibility score for the video news report. A credible report may be flagged and stored in enterprise systems.

An audio-based media coherence graph may be input to an acoustic claim coherence network. An audio report may be split into time-based frames. An integrated speech-to-text architecture may extract and interpret a news claim associated with the frame. The network may convert the text to word embeddings. Word embeddings for the claim and for related fact-checking sources may be input to a graph neural network. The network may concatenate features and use multiple fully connected layers to determine coherence between a report claim, related reports, and confirmed sources. Weighting may be adjusted based on the size of the cluster, based on similarity metrics, based on the report source, or on any suitable factor. The network may output a credibility score for the audio news report. A credible report may be flagged and stored in enterprise systems.

A search may be initiated for flagged reports corresponding to a new or existing customer. In response to a determination of materiality for a retrieved credible report, an account closure protocol may be initiated.

Adverse media screening that integrates optical computing and deep learning networks provides a practical improvement to both processing speed and accuracy of results. Photonic processing enables both hierarchical and spectral clustering of streaming media reports to capture relationships that impact credibility. A graph neural network may concatenate features to determine coherence of content within reports, with regard to related reports, and with regard to fact-checking sources.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
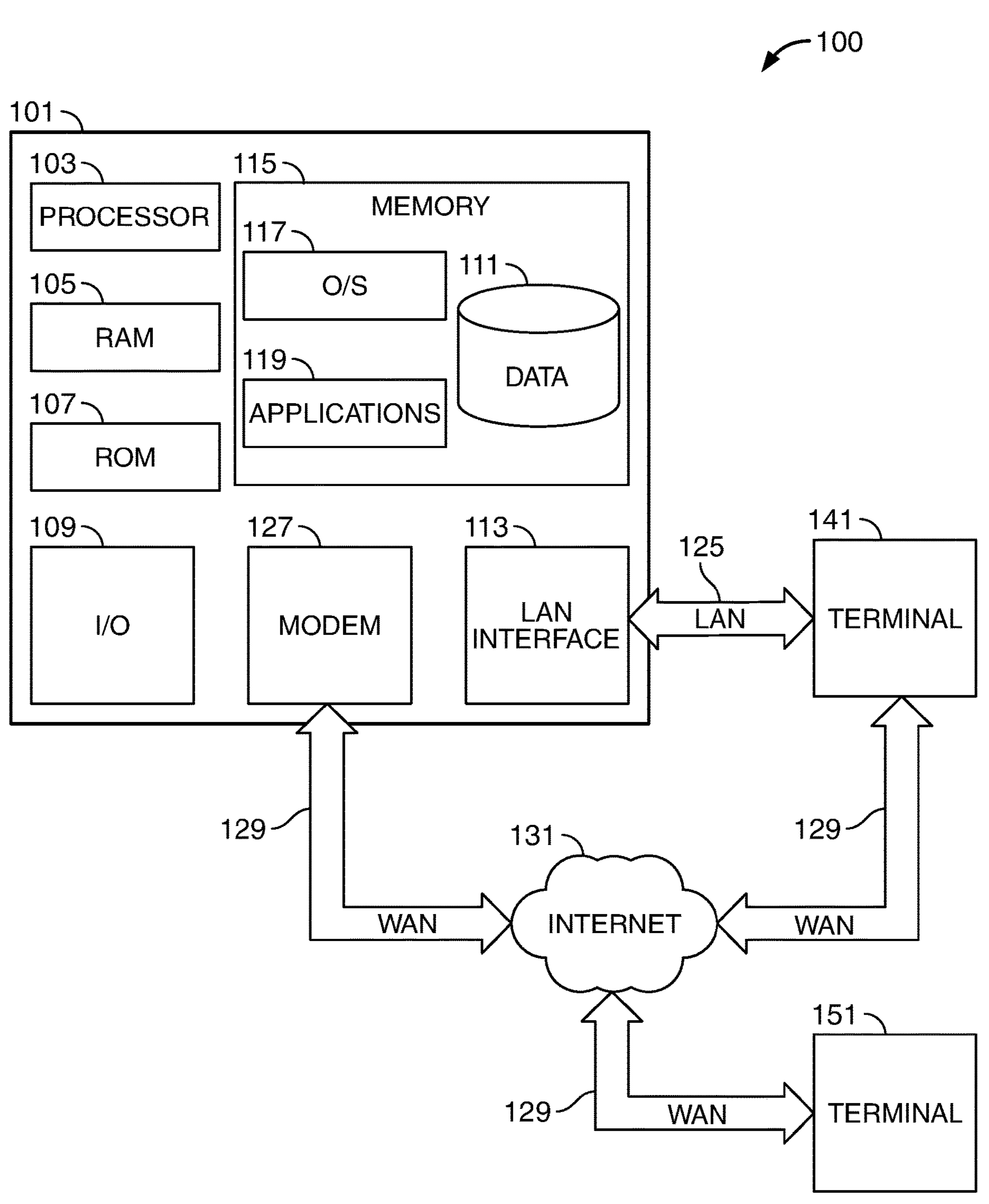
FIG. 1 shows illustrative apparatus in accordance with principles of the disclosure, as set forth in paragraphs 83-95.

Systems, methods, and apparatus are provided for adverse media screening using deep learning architecture.

For the sake of illustration, the invention will be described as being performed by a "system." The system may include one or more features of apparatus and methods that are described herein and/or any other suitable device or approach.

Conventional approaches to screening adverse media are plagued by a range of technical challenges. One challenge is the tremendous volume of reports. It may be difficult to scale screening operations to accommodate the range of input. Another challenge is the variety of news delivery channels and formats. For example, news is often published through social media due to low cost, ease of access and rapid dissemination, while this channel is notorious for low credibility. Another challenge is that existing content-based analysis requires knowledge of political or social context, not available in conventional NLP algorithms.

The system may include a pre-processing and ingestion stack. The pre-processing and ingestion stack may obtain and prepare media data. The system may acquire news reports from a variety of sources. Sources may include news agencies, networking portals, social media, or any suitable source. A news acquiring engine may use APIs to interface with third party systems to obtain the data.

The system may maintain a data lake to store the acquired data. A data lake is a repository of data stored in its raw format. The data lake may store structured data, semi-structured data, unstructured data such as PDF documents, or binary data such as audio or video.

The system may generate multiple data streams from the stored data. The data may be separated based on the type of news report. For example, text-based media, audio-based media, and video-based media may be subject to different forms of analysis. The system may identify duplicate reports and remove the duplicates. The system may generate separate data streams from each type of media in order to provide a continuous flow for real-time dynamic screening.

The system may include a media screening stack. The media screening stack may process each type of media and determine credibility.

The system may use optical computing to power classification models and generate a three-dimensional coherence graph for each type of media. Optical computing may also be known as optoelectronic computing or photonic computing. Optical computing uses photons produced by lasers or diodes for digital computation. Light pulses form the basis of logic gates rather than electrical transistors. Photons provide a higher bandwidth than electrons for faster performance. Using optical computing enables the system to handle large volumes of incoming news data and to classify the data as it is received.

Text-based news reports may be analyzed using a claim coherence network. The network may include a first graphing module. The first graphing module may extract data from text-based news reports. The graphing module may group news reports based on similarities between the reports.

The graphing module may generate a coherence graph. Each node in the graph may correspond to a news report and each edge may represent a relationship between reports. The graphing module may use one or more clustering algorithms to group similar reports.

Each node may have identifying attributes, also known as features. Node attributes may include entities, sources, titles, reporters, dates of publication, or any suitable attributes. Attribute groupings may be determined using cosine similarity, Euclidean distance, or any suitable algorithm.

The graph structure may be represented by an adjacency matrix. The adjacency matrix may capture the arrangement of nodes in a mathematical form. The graph structure be represented in an affinity matrix. The affinity matrix may capture the similarity between nodes in a mathematical form. Edges may be weighted based on a similarity metric such as the affinity matrix and the clustering may partition the graph using the similarity data.

The graphing module may use a spectral clustering algorithm. Spectral clustering may capture complex multidimensional relationships between nodes by using similarity data to reduce the dimensionality of a graph prior to clustering. The graphing module may use a hierarchical clustering algorithm. In some embodiments, hierarchical clustering may establish a directional relationship between nodes based on time of publication. A hierarchical graph may be a tree or a dendrogram.

Each node on the coherence graph may be screened to determine legitimacy. The system may generate a graph neural network (GNN) to determine coherence.

Deep learning classifiers typically utilize a layered structure of algorithms known as artificial neural networks to create a non-linear, multi-dimensional classification model. An artificial neural network encompasses layers of neurons, each neuron taking one or more inputs and producing an output. The output is based on the values of the inputs as well as a weight associated with each input value. Typically, the weights increase the steepness of the activation function dictating how quickly the activation function triggers, while bias delays the trigger of the activation function. Neural networks typically use a sigmoid activation function for non-linear mapping of input values.

The GNN may include multiple hidden layers. Hidden layers in a recurrent neural network may remember outputs from the previous layer though an adjustment of weights and biases. The hidden layers may be dense layers, also known as fully connected layers, in which the neurons are connected to every neuron from the previous layer. The dense layer may use the entire output from the previous layer to reduce the dimensionality of the input vector.

The GNN may include a softmax layer. A softmax function may be used as the activation of function of a neural network layer to normalize the output of a network to a probability distribution over predicted output classes.

The GNN may determine coherence between a claim from a news report and the supporting details in the news report. The GNN may determine coherence between claims from multiple related news reports. The GNN may determine coherence between a claim and supporting details in multiple related news reports. The GNN may concatenate features from multiple related news reports. The GNN may determine coherence between a claim and information from fact-checking source.

The system may extract claims from the news report. The report claims may be topics and subtopics related to client activities. The system may convert the report claims to word embeddings. Word embeddings may be vector representations of the text. The dimensionality of the vector may be based on the size of the text. The dense layers of the neural network may incorporate context and relationships between words within the vector encapsulation.

The system may extract supporting details from the news report. The report details may include evidence that supports the report claims. The report details may include context associated with the report claims. The system may convert the report details to word embeddings.

The system may extract claims from fact-checking sources such as websites. Fact-checking sites may include claims that have been verified through credentialed reporting. The system may convert the fact-checked claims to word embeddings.

The word embeddings may be generated in dimensional matrices such as tensors. The tensors may concatenate inputs to generate the features that are pushed to the deep layers.

The GNN may use neighborhood aggregation to take into account the relationship between nodes. The GNN may perform message passing between nodes by pushing the embeddings from surrounding nodes into a given reference node through the directed edges.

The system may identify multiple reports from different sources that involve the same entity and same time period. Word embeddings from these reports may be pushed to the graph neural network to create a complete set of concatenated features. Higher similarity scores and larger cluster size may increase the weighting to these features within the GNN to reflect an increased probability of authenticity.

The word embeddings may be passed through multiple hidden layers of artificial neurons within the dense layer. Sources for the report claims and report details may also be converted to word embeddings and concatenated as features. A softmax layer may further refine the output from the dense layers.

The system may output a legitimacy score for a text-based news report. The legitimacy score may be compared to a threshold score. If the legitimacy score meets or exceeds the threshold score, the news report may be deemed credible. News reports may be flagged as credible or non-credible and may be stored for future reference. The flagged reports may be stored in the data lake, in an enterprise database, or in any suitable format in any suitable location.

Video-based news reports may be analyzed using an event acoustic coherence network. The network may include a second graphing module. The second graphing module may extract data from video-based news reports. The graphing module may group news reports based on similarities between the reports.

The graphing module may generate a coherence graph. Each node in the graph may correspond to a news report and each edge may represent a relationship between reports. The graphing module may use one or more clustering algorithms to group similar reports.

Each node may have identifying attributes, also known as features. Node attributes may include entities, sources, captions, reporters, dates and/or times of posting or broadcast, or any suitable attributes. Attribute groupings may be determined using cosine similarity, Euclidean distance, or any suitable algorithm.

The graph structure may be represented by an adjacency matrix. The adjacency matrix may capture the arrangement of nodes in a mathematical form. The graph structure may be represented by an affinity matrix. The affinity matrix may capture the similarity between nodes in a mathematical form. Edges may be weighted based on a similarity metric such as an affinity matrix and the clustering may partition the graph using the similarity data.

The graphing module may use a spectral clustering algorithm. Spectral clustering may capture complex multidimensional relationships between nodes by using similarity data to reduce the dimensionality of a graph prior to clustering. The graphing module may use a hierarchical clustering algorithm. In some embodiments, hierarchical clustering may establish a directional relationship between nodes based on time of publication. The hierarchical graph may be a tree or a dendrogram.

Each node on the coherence graph may be screened to determine legitimacy. The system may generate a graph neural network (GNN) to determine coherence.

The GNN may include multiple hidden layers. Hidden layers in a recurrent neural network may remember outputs from the previous layer though an adjustment of weights and biases. The hidden layers may be dense layers, also known as fully connected layers, in which the neurons are connected to every neuron from the previous layer. The dense layer may use the entire output from the previous layer to reduce the dimensionality of the input vector.

The GNN may include a softmax layer. A softmax function may be used as the activation of function of a neural network layer to normalize the output of a network to a probability distribution over predicted output classes.

The system may trim a video report to create video frames. The frame may be input to an integrated three-dimensional convolutional neural network (CNN). The CNN may extract video features from the frame and identify events in the video.

Simultaneously, audio features may be extracted from the frame to provide interpretation of the accompanying audio. Audio features may be extracted using a HEED protocol or by any suitable method.

The events and audio may be input to a GNN. Dense neuron layers may determine coherence between the event and the audio at the time stamp level. A falsified report may contain audio that was superimposed over an original video report. The network may detect such a mismatch. The GNN may concatenate features from related reports in the video coherence graph. The GNN may adjust network weights and biases based on similar reports.

The system may output a legitimacy score for a video-based news report. The legitimacy score may be compared to a threshold score. If the legitimacy score meets or exceeds the threshold score, the news report may be deemed credible. News reports may be flagged as credible or non-credible and may be stored for future reference. The flagged reports may be stored in the data lake, in an enterprise database, or in any suitable format in any suitable location.

Audio-based news reports may be analyzed using an acoustic claim coherence network. The network may include a third graphing module. The third graphing module may extract data from audio-based news reports. The graphing module may group news reports based on similarities between the reports.

The graphing module may generate a coherence graph. Each node in the graph may correspond to a news report and each edge may represent a relationship between reports. The graphing module may use one or more clustering algorithms to group similar reports.

Each mode may have identifying attributes, also known as features. Node attributes may include entities, sources, reporters, dates and/or times of posting or broadcast, radio station, or any suitable attributes. Attribute groupings may be determined using cosine similarity, Euclidean distance, or any suitable algorithm.

The graph structure may be represented by an adjacency matrix. The adjacency matrix may capture the arrangement of nodes in a mathematical form. The graph structure may be represented by an affinity matrix. The affinity matrix may capture the similarity between nodes in a mathematical form. As part of the clustering process, edges may be weighted based on similarity and the clustering may partition the graph using similarity data such as an affinity matrix.

The graphing module may use a spectral clustering algorithm. Spectral clustering may capture complex multidimensional relationships between nodes by using similarity data to reduce the dimensionality of a graph prior to clustering. The graphing module may use a hierarchical clustering algorithm. In some embodiments, hierarchical clustering may establish a directional relationship between nodes based on time of publication. The graph may be a tree or a dendrogram.

Each node on the coherence graph may be screened to determine legitimacy. The system may generate a graph neural network (GNN) to determine coherence.

The GNN may include multiple hidden layers. Hidden layers in a recurrent neural network may remember outputs from the previous layer though an adjustment of weights and biases. The hidden layers may be dense layers, also known as fully connected layers, in which the neurons are connected to every neuron from the previous layer. The dense layer may use the entire output from the previous layer to reduce the dimensionality of the input vector.

The GNN may include a softmax layer. A softmax function may be used as the activation of function of a neural network layer to normalize the output of a network to a probability distribution over predicted output classes.

The system may trim a digital audio report to create audio frames. The frame may input to an integrated three-dimensional recurrent neural network (RNN). The RNN may extract audio features from the frame and interpret the audio based on context. Audio features may be extracted using a HEED protocol or using any suitable method.

The system may incorporate speech to text architecture. The system may identify report claims from the extracted audio features. The system may generate word embeddings for the extracted features to identify the claims.

The acoustic claim coherence network may determine coherence between a claim extracted from an audio frame and fact-checking sources. The fact-checking sources may be clustered into the coherence graph based on similarity scores (such as a similarity between entity attributes). Embeddings generated from the fact-checking sources may be pushed to the GNN. Audio interpretation from the audio report along with features from the fact-checking sources may be input to dense neuron layers in the GNN to determine coherence. The GNN may concatenate features from related reports in the audio coherence graph. The GNN may adjust network weights and biases based on similar reports.

The system may output a legitimacy score for an audio-based news report. The legitimacy score may be compared to a threshold score. If the legitimacy score meets or exceeds the threshold score, the news report may be deemed credible. News reports may be flagged as credible or non-credible and may be stored for future reference. The flagged reports may be stored in the data lake, in an enterprise database, or in any suitable format in any suitable location.

The system may include a customer match and materiality stack. The system may search the data lake or database for flagged reports related to a customer. In some embodiments, a search may be performed automatically in response to a new customer application. In some embodiments, the system may conduct searches for flagged reports related to existing customers at predetermined periodic intervals. The system may determine whether the report is material or nonmaterial.

A task execution stack may take action based on the determinations of credibility and materiality for the news report. A material adverse mention in a news report may result in account closure. Input explaining the account closure may be transmitted to the client and to enterprise stakeholders.

One or more non-transitory computer-readable media storing computer-executable instructions are provided. When executed by a processor on a computer system, the instructions perform a method for determining the credibility of a news report.

The method may include generating a dynamic data stream from reports across a plurality of media channels and formats. A photonic processor may separate text-based media from the data stream and use geometric clustering algorithms to group the text-based media into a three-dimensional graph with a plurality of nodes and edges. The edges may be based on a similarity between node attributes.

The method may include, using a GNN, concatenating features from the nodes. Features may include word embeddings from text associated with the node and word embeddings from text associated with an adjacent node. The adjacent node may share an edge having a threshold measure of similarity. The adjacent node may be fact-checking source.

The method may include inputting the concatenated features to one or more fully connected layers. Outputs may include a coherence between text associated with the node and text associated with a fact-checking source as well as coherence between text associated with the node and text associated with an adjacent node.

The method may include outputting a legitimacy score for the text-based media. The method may include initiating an account closure based on the legitimacy score.

A photonic processor may separate video-based media from the data stream and use geometric clustering algorithms to group the text-based media into a three-dimensional graph with a plurality of nodes and edges. The edges may be based on a similarity between node attributes.

The method may include splitting the media into frames and extracting events and audio at the time stamp level. The method may include, using a GNN, concatenating the features with an adjacent node in the graph. The adjacent node may share an edge having a threshold measure of similarity. The method may include inputting the concatenated features to one or more fully connected layers. Outputs may include a coherence between an event and the corresponding audio.

The method may include outputting a legitimacy score for the video-based media. The method may include initiating an account closure based on the legitimacy score.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. Computer 101 may interact with optical computing apparatus including a photonic processor.

Computer server 101 may include processor 103 for controlling overall operation of the server and its associated components, including RAM 105, ROM 107, input/output ('I/O") module 109, and memory 115.

I/O module 109 may include a microphone, keypad, touch-sensitive screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of clustering reports, generating a coherence graph, generating word embeddings, concatenating features, maintaining a GNN, outputting a legitimacy score, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
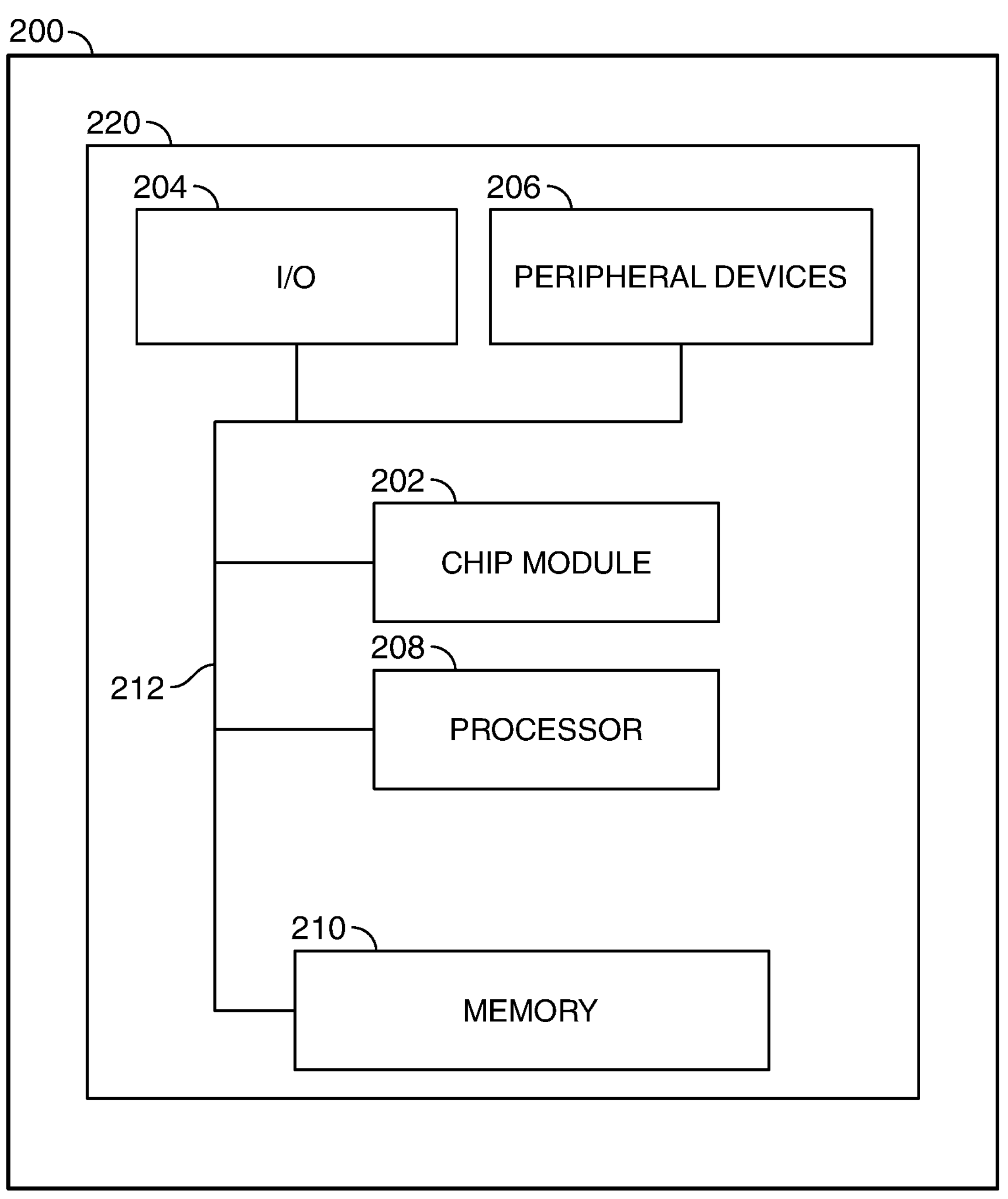
FIG. 2 shows illustrative apparatus in accordance with principles of the disclosure, as set forth in paragraphs 96-101.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may cluster reports, generate a coherence graph, generate word embeddings, concatenate features, maintain a GNN, output a legitimacy score, and perform other methods described herein; and machine-readable memory 210.

Machine-readable memory 210 may be configured to store in machine-readable data structures: media reports, flagged media reports, coherence graphs, legitimacy scores, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
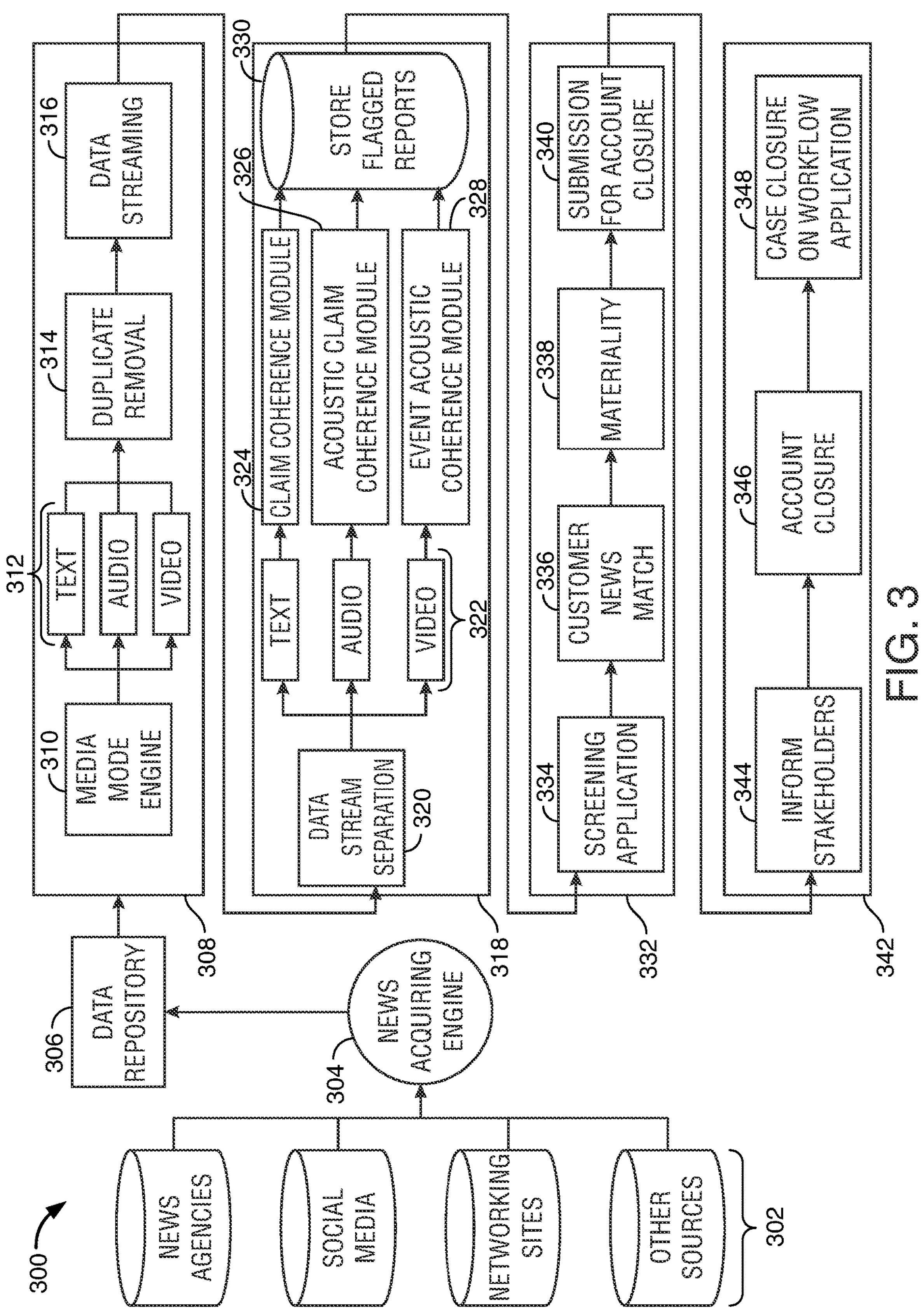
FIG. 3 shows an illustrative process flow in accordance with principles of the disclosure, as set forth in paragraphs 102-106.

FIG. 3 shows high-level process flow 300 for adverse media screening. News acquiring engine 304 may acquire media reports from illustrative news sources 302. Engine 304 may acquire different types of reports including text-based, audio-based, and video-based reports. The reports may include structured, semi-structured, unstructured, and binary data and may be stored in data repository 306.

Pre-processing and ingestion stack 308 may generate a data stream from the raw data. Media mode engine 310 may separate the data based on report format. Illustrative modes 312 include text, audio, and video formats. At 314, duplicate reports may be removed. At 316, a data stream may be generated for dynamic processing.

Media screening stack 318 may identify and flag falsified reports material. At 320, a data stream separation engine may separate out reports based on format. Illustrative formats 322 include text, audio, and video formats. Claim coherence module 324 may include neural networks for determining legitimacy of text-based media reports. Acoustic claim coherence module 326 may include neural networks for determining legitimacy of audio-based media reports. Event acoustic coherence module 328 may include neural networks for determining legitimacy of video-based news reports. Credible news reports may be flagged and stored in data repository 330 for future use. In some embodiments non-credible news reports may also be flagged and stored.

Customer match and materiality stack 332 may use the flagged reports. A case involving a customer may be received at screening application 334. At 336, the application may conduct an automated customer news match. At 338, the application may determine materiality of a credible news report retrieved from data repository 330. At step 340, the application may recommend account closure.

Task execution stack 342 may complete the account closure. At 344, enterprise stakeholders may be informed of the reason for the impending closure. At 346, the account may be closed. At 348, the application workflow may close the case.

Figure 4:
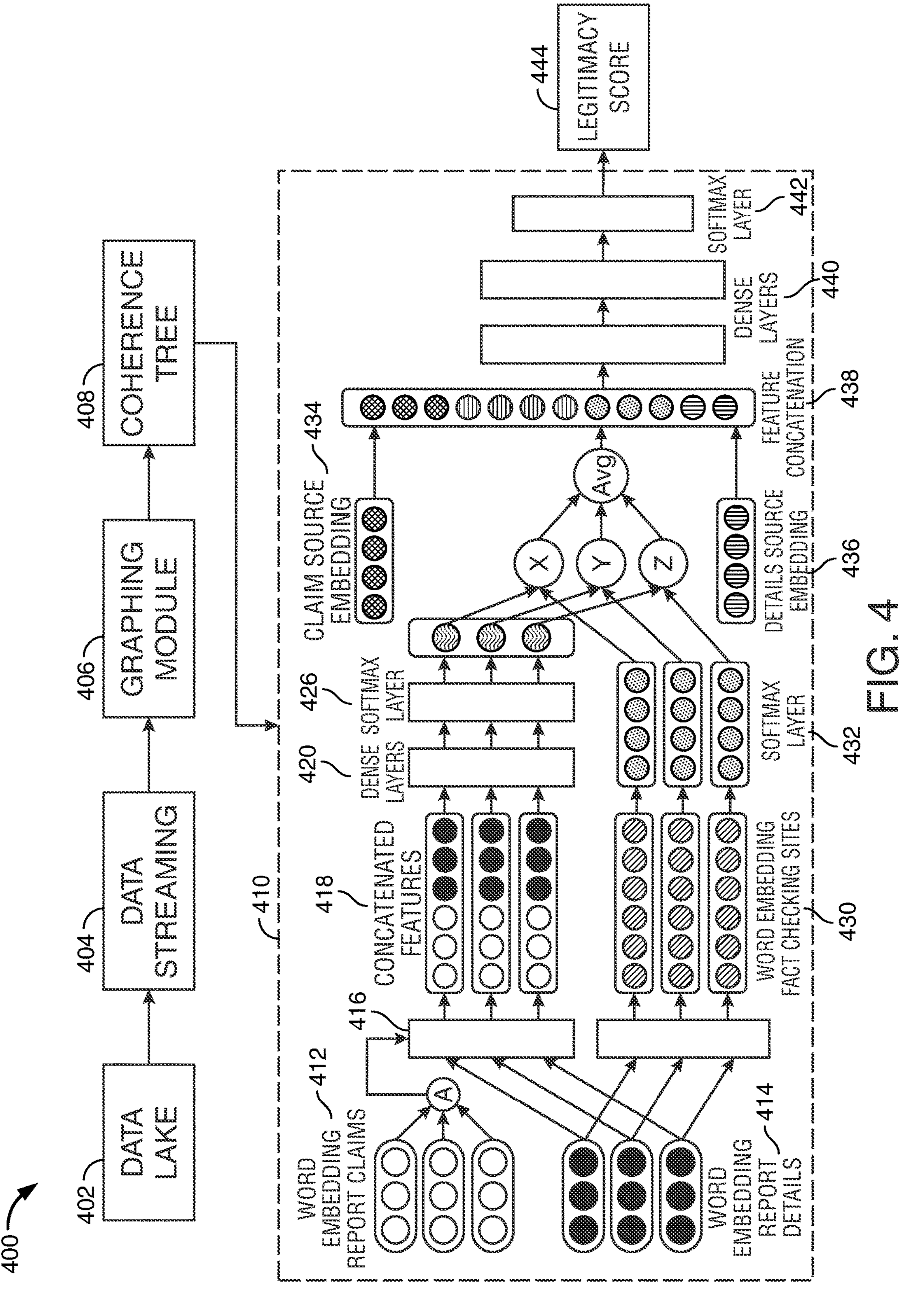
FIG. 4 shows an illustrative process flow in accordance with principles of the disclosure, as set forth in paragraphs 107-110.

FIG. 4 shows illustrative process flow 400 for screening text-based media reports. At 404, reports acquired from news sources may be stored in a data lake. At 406, the reports may be converted to a data stream. At 408, a graphing module may use cosine similarity and clustering algorithms to group similar reports. At 410, the graphing module may generate a coherence graph. A photonic processor may be used to improve speed and performance via optical computing.

The graph may input to GNN 412. At 414, claims extracted from a news report may be converted to word embeddings. At step 416, supporting details from the news report may also be converted to word embeddings. Claim word embeddings from similar reports may be pushed to the GNN using message passing and summed. At 420, the claim word embeddings and article word embeddings may be concatenated into features. At 422, the features may be input to fully connected dense layers of the network to refine dimensionality of the vectors. At step 422, the features may input into a softmax layer.

At 430, data from fact-checking sites may be converted to word embeddings. The fact-checking sites may be included in the coherence tree so that data having similar attributes may be extracted. At 432, the vectors are input to a softmax layer.

Outputs from the various portions of the network may be averaged and concatenated with word embeddings for sources of the claims and sources of the supporting details. At 436, the features may be flattened to further reduce dimensionality and refine the output. At 440, the concatenated features may be input to a dense layer. At 442, the output may be input to a softmax layer to normalize the output to a probability distribution. At 444, the system may output a legitimacy score for the report.

Figure 5:
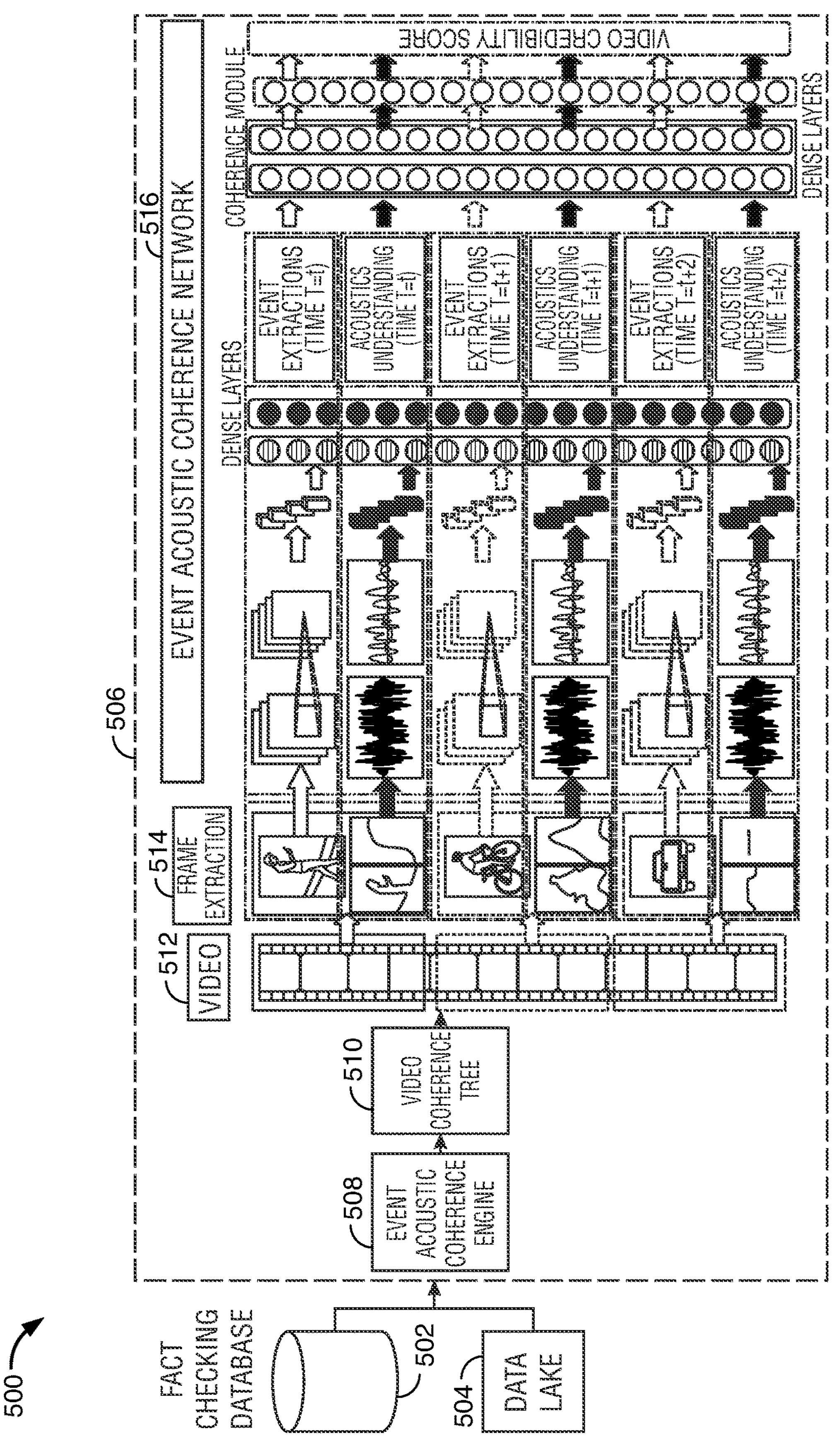
FIG. 5 shows an illustrative process flow in accordance with principles of the disclosure, as set forth in paragraphs 111-114.

FIG. 5 shows illustrative process flow 500 for screening video-based media reports. At 502, reports acquired from fact-checking sources may be stored in a database. At 504, reports acquired from news sources may be stored in a data lake. The reports may be screened at event acoustic coherence module 506.

At 508, an event acoustic coherence engine may use a similarity matrix and clustering algorithms to generate a video coherence tree. Video coherence tree 510 may group reports and fact-checking sources based on similar attributes. A photonic processor may be used to improve speed and performance via optical computing.

At 512, a video report may be split into multiple time-based frames. At step 514, audio and video may be extracted from the frames. A CNN may be integrated into the network to identify events in the video. An RNN may be integrated into the network to interpret audio from the frames. The audio may be interpreted using an integrated speech-to-text architecture.

An identified video event and interpreted audio may be input to dense layers of a GNN. The GNN may determine coherence between identified video events and the interpreted audio for a given time stamp. The network may output a legitimacy score for the video report.

Figure 6:
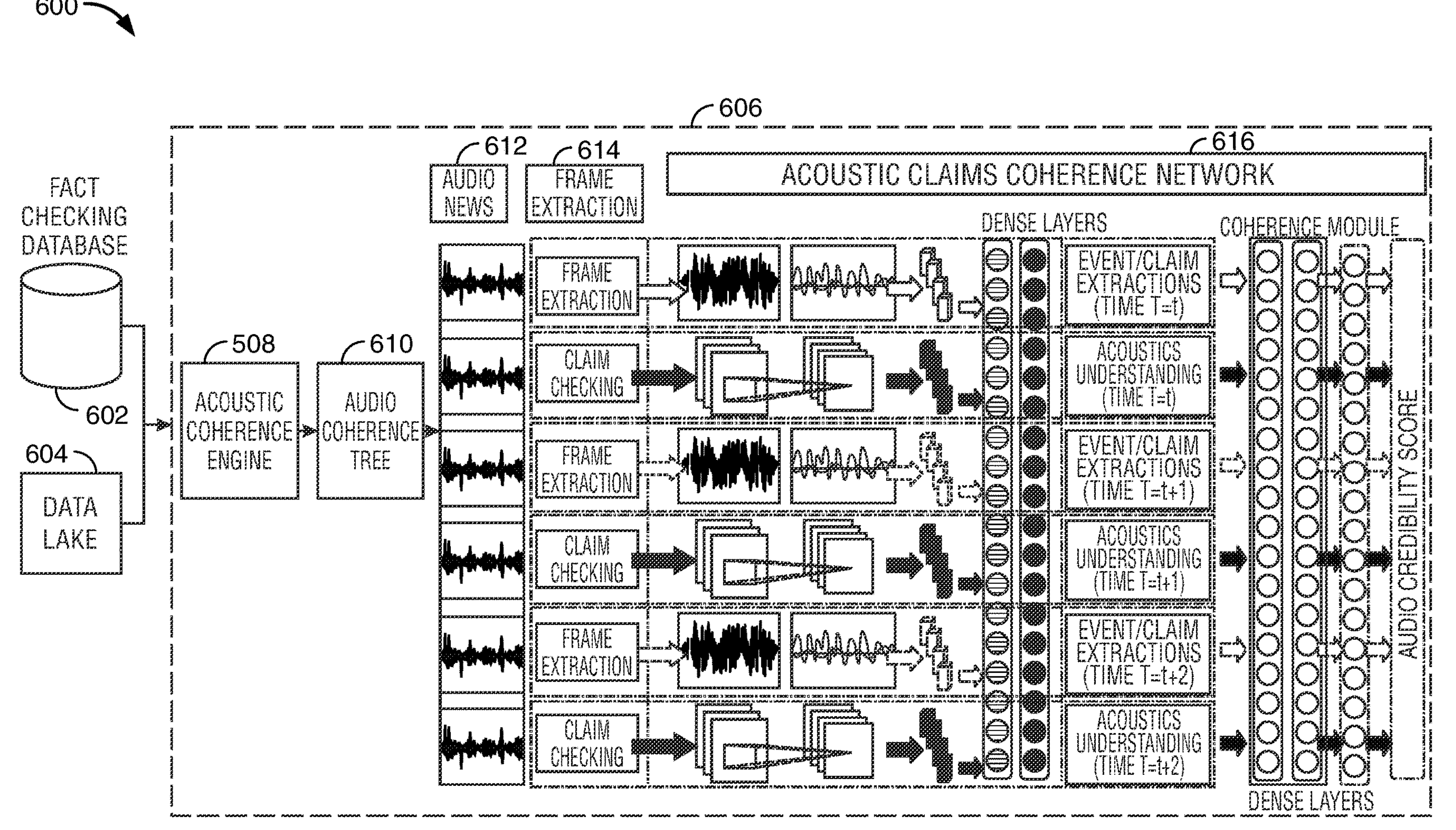
FIG. 6 shows an illustrative process flow in accordance with principles of the disclosure, as set forth in paragraphs 115-119.

FIG. 6 shows illustrative process flow 600 for screening audio-based media reports. At 602, reports acquired from fact-checking sources may be stored in a database. At 604, reports acquired from news sources may be stored in a data lake. The reports may be screened at acoustic coherence module 606.

At 608, an acoustic coherence engine may use a similarity matrix and clustering algorithms to generate an audio coherence tree. Audio coherence tree 610 may group reports and fact-checking sources based on similar attributes. A photonic processor may be used to improve speed and performance via optical computing.

At 612, an audio report may be split into multiple time-based frames. At step 614, audio from a frame may be input to an integrated RNN to extract content and identify news claims.

The audio claims may be input to dense layers of a GNN along with word embeddings from similar fact-checking sources. The GNN may determine coherence between the audio claims and the fact-checking sources. The GNN may concatenate features from related reports in the audio coherence graph. The GNN may adjust network weights and biases based on similar reports. The GNN may output a legitimacy score for the audio report.

Thus, methods and apparatus for DEEP LEARNING ARCHITECTURE FOR ADVERSE MEDIA SCREENING are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for using an optoelectronic deep learning architecture to detect fabricated report material regarding a client, the method comprising, using a photonic processor:

generating a dynamic data stream comprising news reports from a plurality of media channels, the data stream comprising text-based media, video-based media, and audio-based media;

separating text-based media from the data stream;

using a geometric clustering algorithm, grouping the text-based media into a first tree comprising a plurality of nodes, an arrangement of the nodes based at least in part on a similarity between node attributes, each node comprising a news report, the attributes for each node comprising title, source, reporter, date of publication, and topic;

at a first graph neural network (GNN), screening a node from the first tree to determine credibility of the news report, the screening comprising:

concatenating features for the node, the features comprising:

word embeddings from text extracted from the node, the text comprising a claim and supporting details associated with the claim;

word embeddings from text extracted from a fact-checking source, the text comprising a claim verified through credentialed reporting; and an affinity matrix representing an arrangement of nodes in the first tree having a threshold similarity; and inputting the concatenated features to one or more fully connected layers in the first GNN to determine:

a coherence between the claim and the supporting details in the news report;

a coherence between the news report and the fact-checking source; and a legitimacy score associated with the news report;

separating video-based media from the data stream;

using the geometric clustering algorithm, grouping the video-based media into a second tree comprising a plurality of nodes, each node comprising a video news report, an arrangement of the nodes based at least in part on a similarity between node attributes;

splitting a video news report into a set of time-based frames;

at a second GNN, screening a node from the second tree to determine credibility of the video news report, the screening comprising:

concatenating features from a frame, the features comprising:

an event extracted from video associated with the frame;

an audio clip extracted from video associated with the frame; and an affinity matrix associated with the arrangement of nodes in the second tree; and inputting the concatenated features to one or more fully connected layers in the second GNN to determine:

a coherence between the event and the audio clip; and a legitimacy score associated with the video news report;

screening output from the first GNN and the second GNN for an adverse news report regarding the client;

determining whether the adverse news report regarding the client is credible and material, based at least in part on comparison of a legitimacy score associated with the adverse news report to a threshold legitimacy score; and in response to a determination that the adverse news report regarding the client is credible and material:

flagging the adverse news report and storing the flagged adverse news report in a data repository;

initiating closure of an account associated with the client;

notifying the client of the adverse news report and the closure of the account; and closing the account.

2. The method of claim 1, further comprising removing duplicate reports from the data stream.

3. The method of claim 1, wherein the node attributes at the first tree are vectors, the vectors comprising named entity and time of publication.

4. The method of claim 1, the first tree further comprising a plurality of edges, the method further comprising:

weighting an edge based on a similarity between connected nodes; and based on the weighting, pushing a word embedding associated with text from an adjacent node to the first GNN.

5. The method of claim 4, further comprising, at the first GNN, determining coherence between the report and one or more related reports.

6. The method of claim 1, further comprising retrieving a flagged adverse news report from storage and determining materiality prior to initiating the account closure.

7. The method of claim 1, further comprising, at the second GNN:

using an integrated speech-to-text architecture to interpret the audio clip; and using a convolutional neural network to extract the event from the video frame.

8. The method of claim 1, at the second GNN, the coherence comprising a determination that content of the audio clip corresponds to the event.

9. One or more non-transitory computer-readable media storing computer-executable instructions which, when executed by a processor on an optical computer system, perform a method for determining credibility of a news report regarding a client, the method comprising:

generating a dynamic data stream comprising news reports from a plurality of media channels, the data stream comprising text-based media, video-based media, and audio-based media;

separating text-based media from the data stream;

using a geometric clustering algorithm, grouping the text-based media into a first tree comprising a plurality of nodes and edges, the edges based at least in part on a similarity between node attributes, each node comprising a news report, the attributes for each node comprising title, source, reporter, date of publication, and topic;

at a first graph neural network (GNN), screening a node from the first tree to determine credibility of the news report, the screening comprising:

concatenating features from the node, the features comprising:

word embeddings from text extracted from the node, the text comprising a claim and supporting details associated with the claim;

word embeddings from text extracted from a fact-checking source, the text comprising a claim verified through credentialed reporting; and an affinity matrix representing an arrangement of nodes in the first tree having a threshold level of similarity; and processing the concatenated features through one or more fully connected layers in the first GNN to determine:

a coherence between the claim and the supporting details in the news report;

a coherence between the news report and the fact-checking source; and a legitimacy score associated with the news report;

separating video-based media from the data stream;

using the geometric clustering algorithm, grouping the video-based media into a second tree comprising a plurality of nodes and edges, the edges based at least in part on a similarity between node attributes, each node comprising a video news report;

splitting a video news report into a set of time-based frames;

at a second GNN, screening a node from the second tree to determine credibility of the video news report, the screening comprising:

concatenating features from a frame, the features comprising:

an event extracted from video associated with the frame;

an audio clip extracted from video associated with the frame; and an affinity matrix representing an arrangement of nodes in the second tree having a threshold level of similarity; and processing the concatenated features through one or more fully connected layers of the second GNN to determine:

a coherence between the event and the audio clip; and a legitimacy score associated with the video news report;

in response to an output from the first GNN or the second GNN comprising an adverse news report regarding the client, determining whether the adverse news report regarding the client is credible, based at least in part on comparison of a legitimacy score associated with the adverse news report to a threshold legitimacy score; and in response to a determination that the adverse news report regarding the client is credible:

flagging the adverse news report and storing the flagged adverse news report in a data repository;

initiating closure of an account associated with the client;

notifying the client of the adverse news report and the closure of the account; and closing the account.

10. The media of claim 9, further comprising removing duplicate reports from the data stream.

11. The media of claim 9, wherein the node attributes at the first tree are vectors, the vectors comprising entity and time of publication.

12. The media of claim 9, further comprising, at the first tree, weighting an edge based on the affinity matrix and based on the weighting, pushing a word embedding associated with text from an adjacent node to the graph neural network.

13. The media of claim 9, further comprising retrieving a flagged report from storage and determining materiality prior to initiating the account closure.

14. The media of claim 9, further comprising, at the second GNN, using an integrated speech-to-text architecture to interpret the audio clip.

15. The media of claim 9, at the second GNN, the coherence comprising a determination that content of the audio clip corresponds to the event.

16. A system for determining credibility of a news report, the system comprising:

a first processor configured to generate a dynamic data stream comprising news reports from a plurality of media channels, the data stream comprising text-based media, video-based media, and audio-based media;

a second, photonic processor configured to:

separate text-based media from the data stream;

using a geometric clustering algorithm, group the text-based media into a first tree comprising a plurality of nodes and edges, the edges based at least in part on a similarity between node attributes, each node comprising a news report, the attributes for each node comprising title, source, reporter, date of publication and topic;

at a first graph neural network (GNN):

concatenate features for a node from the first tree, the features comprising:

word embeddings from text extracted from the node;

word embeddings from text extracted from an adjacent node, the adjacent node sharing an edge having a threshold measure of similarity; and an affinity matrix associated with an arrangement of nodes in the first tree; and input the concatenated features to one or more fully connected layers of the first GNN to determine:

a coherence between the text extracted from the node and text extracted from an adjacent node; and a legitimacy score associated with the news report;

separate video-based media from the data stream;

using the geometric clustering algorithm, group the video-based media into a second tree comprising a plurality of nodes and edges, the edges based at least in part on a similarity between node attributes, each node comprising a video news report;

split a video news report into a set of time-based frames;

at a second GNN:

concatenate features from a frame, the features comprising:

an event extracted from video associated with the frame;

an audio clip extracted from video associated with the frame; and an affinity matrix associated with an arrangement of nodes in the second tree; and input the concatenated features to one or more fully connected layers of the second GNN to determine:

a coherence between the event and the audio clip; and a legitimacy score associated with the video news report; and a third processor configured to:

in response to an output from the first GNN or the second GNN comprising an adverse news report regarding the client, determine whether the adverse news report regarding the client is credible, based at least in part on comparison of a legitimacy score associated with the adverse news report to a threshold legitimacy score; and in response to a determination that the adverse news report regarding the client is credible:

flag the adverse news report and store the flagged adverse news report in a data repository;

initiate closure of an account associated with the client;

notify the client of the adverse news report and the closure of the account; and close the account.

17. The system of claim 16, the photonic processor configured to adjust weighting of an edge at the first tree or the second tree based on a size of a cluster.

* * * * *